United States Patent [19]
Bihary et al.

[11] Patent Number: 4,746,005
[45] Date of Patent: May 24, 1988

[54] PALLET LOCATING, CLAMPING, ROTATING AND TRANSFER ASSEMBLY

[75] Inventors: Frank Bihary, Kinnelon; Alfred J. Huber, Clifton; Henry N. Shoiket, Rutherford; William F. Crawford, Upper Montclair, all of N.J.

[73] Assignee: Standard Tool & Manufacturing Co., Lyndhurst, N.J.

[21] Appl. No.: 44,812

[22] Filed: Apr. 30, 1987

[51] Int. Cl.$^4$ ............................................. B65G 37/00
[52] U.S. Cl. ..................... 198/465.1; 198/346.1; 198/412; 104/35; 104/49
[58] Field of Search ................... 198/379, 412, 465.1, 198/465.2, 741, 742, 803.01, 346.1; 104/35, 162; 414/222, 223; 29/33 P, 563; 104/48, 49

[56] References Cited

U.S. PATENT DOCUMENTS

| | | | |
|---|---|---|---|
| 3,473,645 | 10/1969 | Kidd | 198/742 |
| 3,504,781 | 4/1970 | Lehmann et al. | 104/162 |
| 3,530,571 | 9/1970 | Perry | 198/465.2 |
| 3,556,011 | 1/1971 | Saxonmeyer | 104/48 |
| 3,934,701 | 1/1976 | Mooney et al. | 198/465.1 |
| 4,389,941 | 6/1983 | Berk et al. | 198/465.2 |
| 4,462,313 | 7/1984 | Sleep et al. | 104/48 |
| 4,676,362 | 6/1987 | Malzkorn | 198/465.1 |

Primary Examiner—Joseph E. Valenza
Attorney, Agent, or Firm—Harness, Dickey & Pierce

[57] ABSTRACT

A workpiece transfer assembly which enables a workpiece affixed to a pallet to be rotated at a work station and thereafter returned to its original position for longitudinal indexing along the transfer line. The transfer line includes a pallet locating and supporting unit which carries a first transfer bar segment. The pallet locating and supporting means includes bearing which enable the first transfer bar segment to be longitudinally indexed and rotated about its longitudinal axis. A rotary indexing assembly is provided for rotating the pallet supporting and locating device. A second transfer bar segment is carried by an intermediate transfer section. Both transfer bar segments include end features which interlockingly engage; thus, enabling the rotational and longitudinal movement to be transferred along the bar sections when they are aligned, but permitting the first transfer bar segment to be rotated out of engagement with the remaining transfer bar segments. Accordingly, at a particular work station, the pallet can be rotated to any desired angular position.

12 Claims, 6 Drawing Sheets

PALLET LOCATING, CLAMPING, ROTATING AND TRANSFER ASSEMBLY

BACKGROUND OF THE INVENTION

This invention relates to a material transfer mechanism and particularly to one useful for transporting pallets which support workpieces and for enabling the pallets to be rotated to any desired position while dwelling at a particular work station.

Typical transfer machines intermittently advance pallets along a transfer line to various work stations where operations such as machining, drilling, milling, etc. are performed on workpieces carried by the pallets. Advancement of the pallets along the transfer line is typically achieved by using an elongated transfer bar having a plurality of radially extending dogs which engage the pallets. The transfer bar is rotated to a position wherein the dogs engage the pallets, and is stroked longitudinally to index the pallets to their next position. The transfer bar is thereafter rotated so that the pallet dogs disengage the pallets, and is then retracted to its original position. This process of longitudinal and rotational motion is continued cyclically to index the pallets to each of the work stations in the line. In order to enable machining of the various surfaces of a workpiece, it is often necessary to rotate the workpiece about a vertical axis in order to permit a tool to access the desired workpiece area.

Rotation of the pallets in accordance with the prior art techniques requires a dedicated workpiece turning station which lifts a pallet and rotates it 90 degrees and then lowers it to reengage the pallet supporting rails for continued advancement along the transfer line. An example of this prior art technique is described in U.S. Pat. No. 3,271,840.

Although workpiece turning devices according to the prior art operate statisfactorily in many situations, they have significant limitations. Such mechanisms enable rotation only in 90-degree increments. Rotated positions of the workpiece at other angles is not permitted. If all four facing surfaces of a workpiece require machining, as many as three separate turning devices are needed at dedicated stations to rotate the workpiece through the required 270 degrees of rotation. More significantly, however, the prior art requires that dedicated pallet rotating stations be provided between the stations where machining operations occur, thus lengthening and complicating the transfer line.

SUMMARY OF THE INVENTION

The present invention provides an improved device for rotating workpieces moving along a transfer line. The assembly according to the present invention employs a rotary indexing table which rotates a pallet locating and clamping assembly along with a segment of the transfer bar which becomes decoupled from the remaining sections of transfer bar. The transfer bar segment which rotates at the work stations joins the associated sections of the transfer bar at interlocking joints at either side of the station. The interlocking features at the ends of the transfer bar segments allow the work station to be rotated; thus disconnecting the transfer bar segment which is thereafter returned to its original position into engagement with associated transfer bar segments where reciprocation of the transfer bar assembly and longitudinal indexing of the workpieces can resume. The interlocking coupling between transfer bar segments may have a dove-tail or key slot configuration which enables the sections to be rotated out of engagement and later reengaged, while transferring rotation between transfer bar segments about their longitudinal axes during longitudinal indexing of the workpieces. The transfer assembly includes a means for retaining the transfer bar segment carried by a machining station in a given rotated and axial position while the pallet locating and clamping assembly is rotated to insure that it will be in the proper orientation to reengage other transfer bar segments when it is returned to its original position.

Additional benefits and advantages of the present invention will become apparent to those skilled in the art to which this invention relates from the subsequent description of the preferred embodiments and the appended claims taken in conjunction with the accompanying drawings.

BRIEF DESCRIPTION OF THE DRAWINGS

FIG. 7 is a side-elevational view of a transfer assembly in accordance with a second embodiment of this invention which employs a cylinder operated lockup mechanism;

FIG. 8 is a side-elevational view partially in section showing a transfer assembly according to a third embodiment of this invention utilizing a modified transfer dog and associated mechanism;

FIG. 9 is a side-elevational view of the transfer assembly shown in FIG. 8, particularly showing the open bearings used for this embodiment.

DETAILED DESCRIPTION OF THE INVENTION

A transfer assembly in accordance with the first embodiment of this invention is illustrated in FIGS. 1-6 and is generally designated by reference number 10. The transfer assembly 10 is adapted for moving workpieces (not shown) mounted on pallets 12 that slide on supporting surfaces 13 in the machine stations and, on rails 42 extending between the stations. In practice, the surfaces 13 and the rails 42 collectively define a transfer line for machining operations. The palletized workpieces are advanced by one or more power actuated transfer bars progressively through work stations disposed along the transfer line; and the pallets are positioned precisely and clamped securely in the stations by pallet locating and clamping mechanisms 14 also in the stations preparatory to machining operations on the workpiece such as milling, facing, drilling, etc. It is contemplated that any suitable or conventional locating and clamping mechanism may be used; and a typical example thereof is disclosed by U.S. Pat. No. 3,271,840 which is hereby incorporated herein by reference. Conventionally, a rigid transfer bar having radially projecting transfer dogs is alternately advanced and retracted longitudinally and rotated in a coordinated fashion such that the dogs engage the pallets to advance them from station to station, and then disengage the pallets to permit retraction of the bar.

Transfer bars according to the prior art are elongated rigid members which may be unitary or formed from a plurality of securely interconnected separate sections or components. In such systems, when it is necessary to rotate a workpiece, the pallet on which it is mounted must be lifted free of the supporting surface on which it is supported in the station and then rotated or turned angularly a predetermined amount—usually 90 degrees. This procedure has significant disadvantages including those discussed above.

In accordance with the present invention, the disadvantages of the above-described prior art techniques are overcome by employing a multi-piece transfer bar assembly 16 having segments 28 that are normally detachably interconnected for mutual longitudinal motion but each of which can be rotated out of engagement with other adjacent segments at a machining work station; thus, enabling the workpiece associated therewith to be rotated to any desired position and thereafter returned to its original position for indexing along the transfer line.

Figure 1:
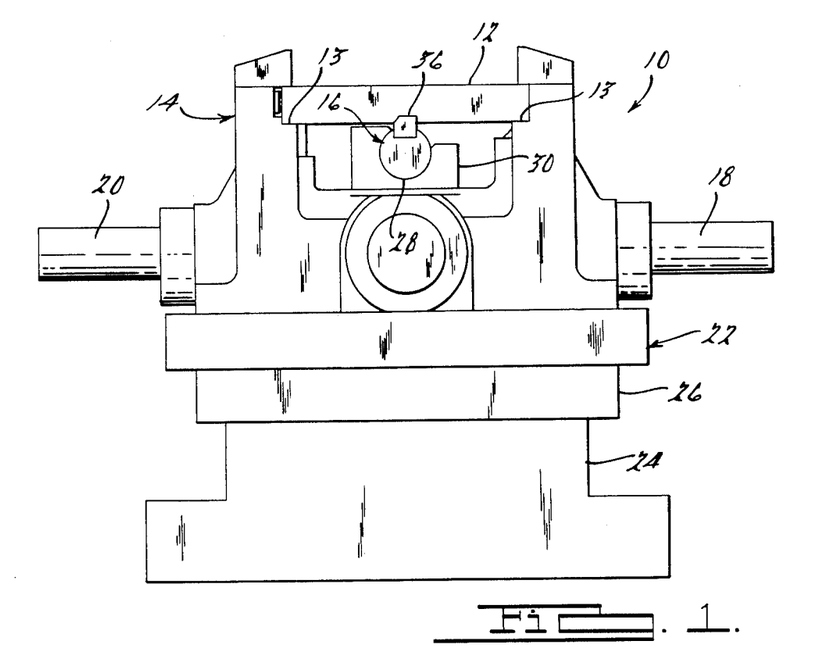
FIG. 1 is a front view of a transfer assembly according to a first embodiment of this invention.
Figure 3:
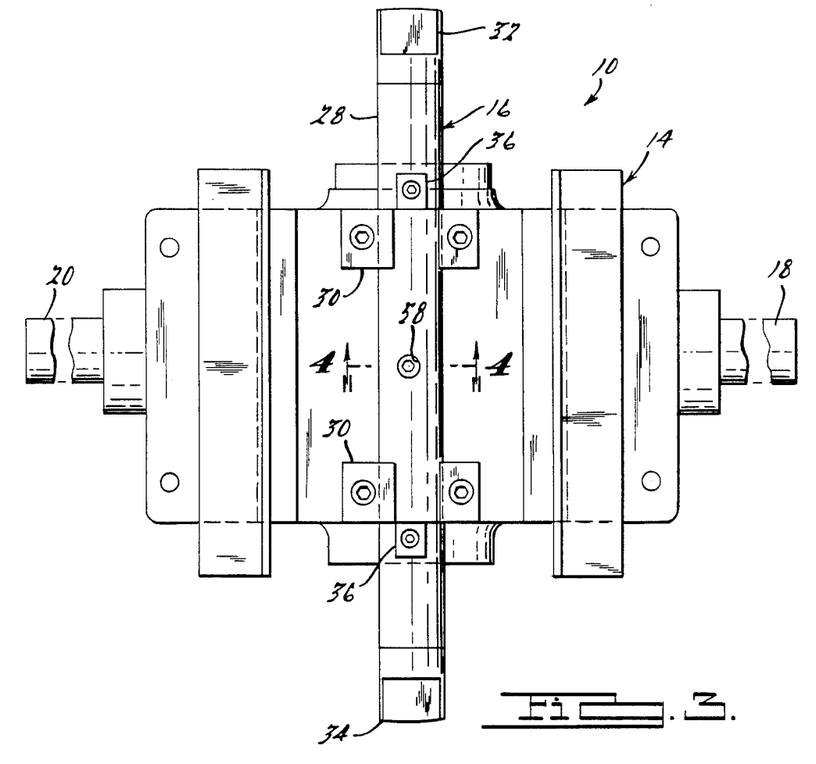
FIG. 3 is a top view of the transfer assembly shown in FIG. 1.

In the present invention, as suggested, rotation of the workpiece occurs at a machining work station; and in FIG. 1, the numeral 22 designates such a work station in a transfer machine. The work station 22 includes a rotary indexing table 24 which is rigidly mounted on a suitable support structure. The indexing table 24 can be actuated to provide any desired angular degree of rotation; and the pallet locating and clamping mechanism 14 is mounted on and fixed to the table for mutual rotation therewith via a shim plate 26. The pallet locating and clamping mechanism 14 conventionally includes a pair of hydraulic cylinders 18 and 20 that are operable to actuate mechanisms that locate and securely clamp the pallet 12 prior to machining operations. According to the present invention, each work stations 22 has a transfer bar segment or section 28 associated therewith; and FIG. 3 shows the manner in which the transfer bar segment 28 is carried by the locating and clamping mechanism 14 in that station. More particularly, a pair of spaced open bearings 30 at opposite ends of the station support the transfer bar segment 28 for longitudinal and rotary motion. The transfer bar segment 28 is provided with end portions 32 and 34 that are uniquely designed and constructed so as to enable them to interlockingly engage with adjacent transfer bar segments in a manner and for a purpose that will be explained in greater detail hereinafter. A pair of longitudinally spaced transfer dogs 36 affixed to the transfer bar segment 28 act to confine the pallet 12 therebetween when the segment is in a particular rotated position.

The pallet 12 is moved from one station in the machine to the next station by first rotating the transfer bar segment 28 to the position shown in FIG. 3 in which the transfer dogs 36 embrace and engage the pallet 12. Thereafter, the bar segment 28 is advanced longitudinally a distance equal to the distance between the stations and then rotated about its longitudinal axis to disengage the transfer dogs 36 from the pallet 12 so that the transfer bar segment can be retracted to its original position without moving the pallet in a reverse direction.

Figure 2:
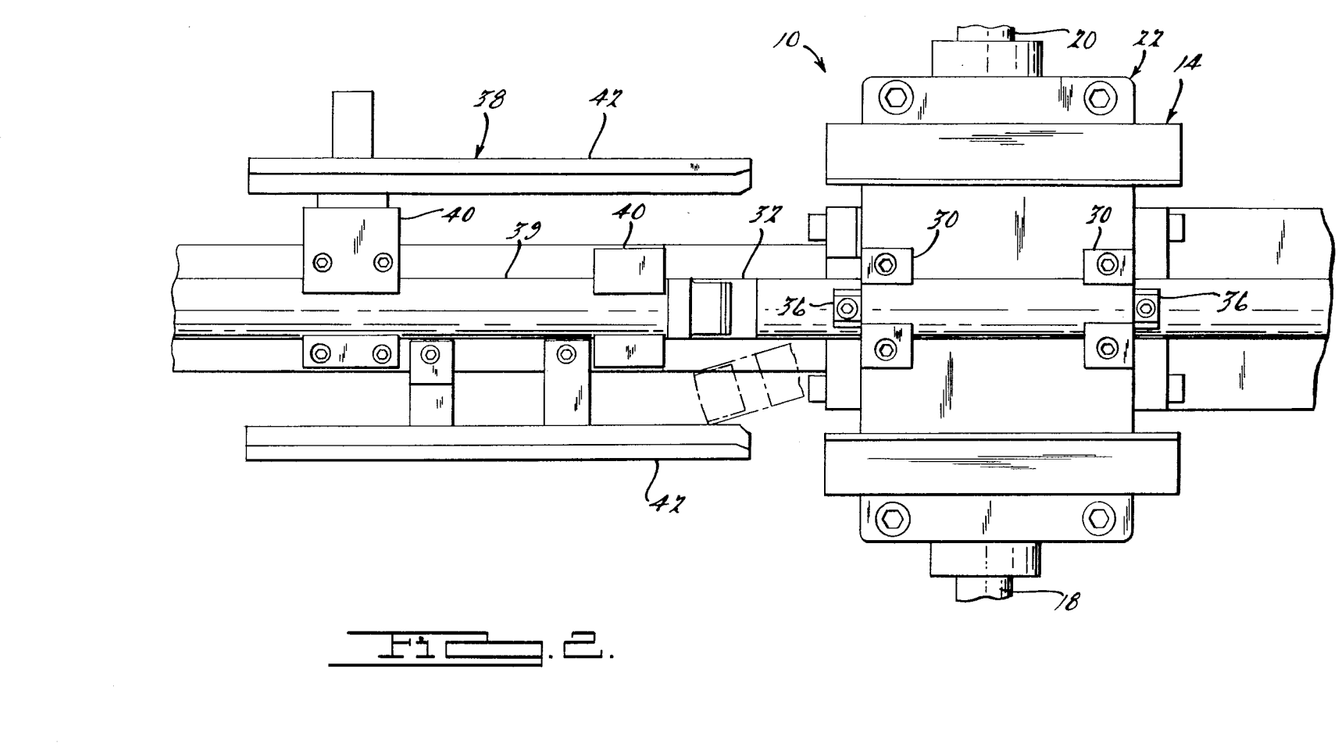
FIG. 2 is a top view of the transfer assembly shown in FIG. 1 and further showing guide rails associated with an intermediate transfer section.
Figures 5, 6:
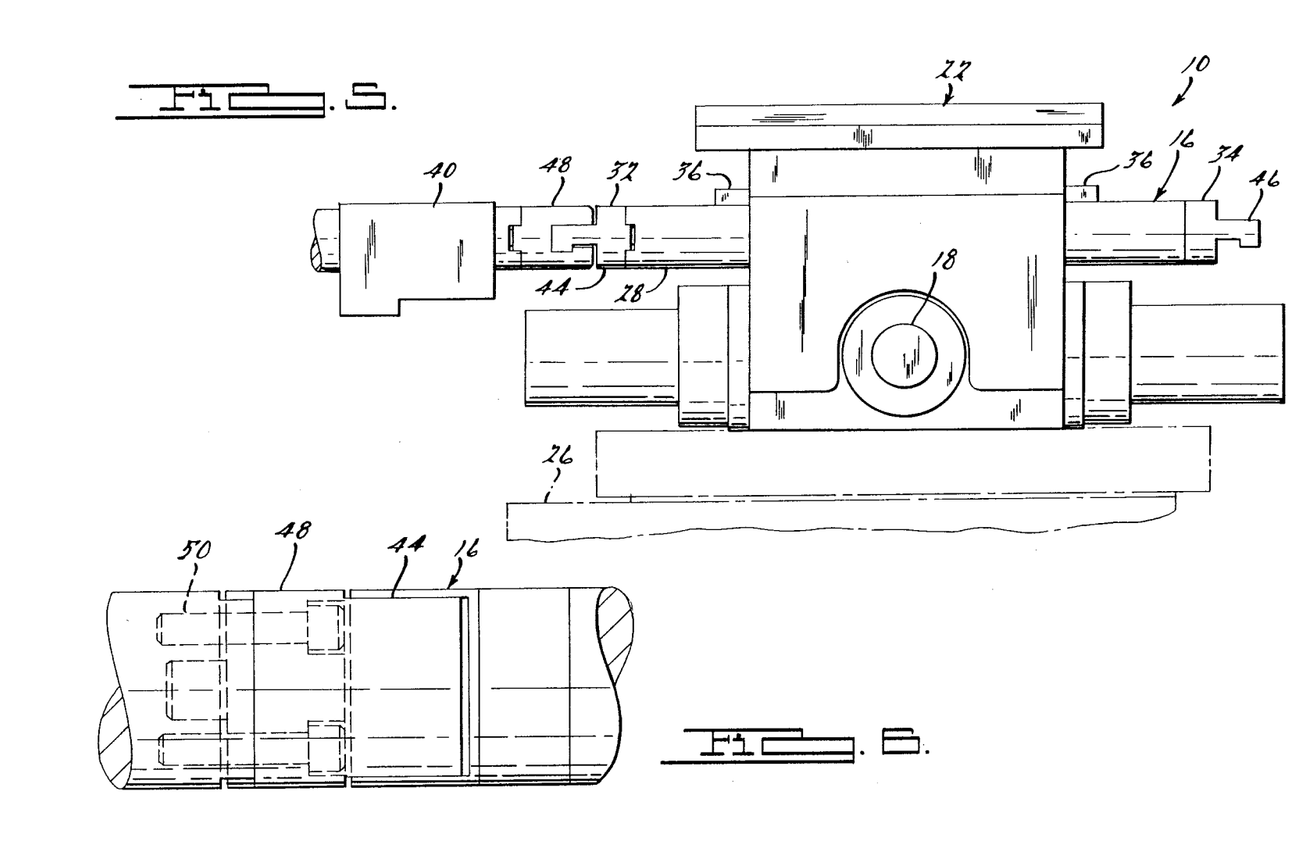
FIG. 5 is a side-elevational view showing the transfer assembly illustrated in FIG. 1 showing the interlocking engagement between associated transfer bar sections.
FIG. 6 is a top view of the interface between associated transfer bar sections.

FIG. 2 illustrates a work station 22 connected to an intermediate transfer section 38 which includes one or more slide bearings 40 which support the transfer bar segment 39 and a pair of laterally spaced guide rails 42 that support the pallets 12 as they are advanced along the transfer line. As stated previously, the work station 22 enables the pallets 12 to be rotated about a vertical axis to any given orientation in the station. This feature is provided by the ends 32 and 34 of the transfer bar segment 28 which interlock with associated adjacent transfer bar segments (e.g. segment 39). As shown in FIG. 5, the ends 32 and 34 here shown define key slot-type mating arrangements. In the embodiment shown in FIG. 5, the ends 32 and 34 are defined by male key slot engaging sections 44 and 46, respectively, affixed to either end of the transfer bar segment 28. The sections 44 and 46 engage with a female key slot engaging section 48. As shown in FIG. 6, the engaging sections 44, 46 or 48 may be affixed to the associated transfer bar segments by means such as threaded fasteners 50. As shown in FIG. 5, engaging sections 44 and 48 interlockingly engage. Due to this engagement, the longitudinal and rotational motion of the transfer bar assembly 16 is transmitted between its individual sections thus enabling them to operate when in the position shown in FIG. 5 in a generally conventional manner.

Due to the configuration of the engaging sections 44 and 48, the pallet locating and clamping mechanism 14 may be rotated by the rotary indexing table 24. When this occurs, the transfer bar segment 28 also rotates such that its ends move out of engagement with the corresponding ends of the intermediate transfer bar segment 39, as shown by the phantom line positions of the bar segment shown in FIG. 2. Rotation of the workpiece can be made to any desired angular position (i.e. not constrained to 90 degree increments). In addition, the present invention allows for machining of the workpiece during rotation giving it form Axis CNC capability. The rotary indexing table 24 presently available are capable of accurately positioning the workpieces and withstand large machining loads. Consequently, in accordance with this invention, great flexibility is provided in optimally positioning the workpiece about a vertical axis. Once the machining (or other) operation is completed, the rotary indexing table 24 returns the pallet locating and clamping mechanism 14 to its normal position shown in FIGS. 2 and 5, whereupon the transfer bar segment 28 automatically reengages the associated transfer bar segments thus enabling indexing of the pallets 12 in a conventional manner.

Figure 4:
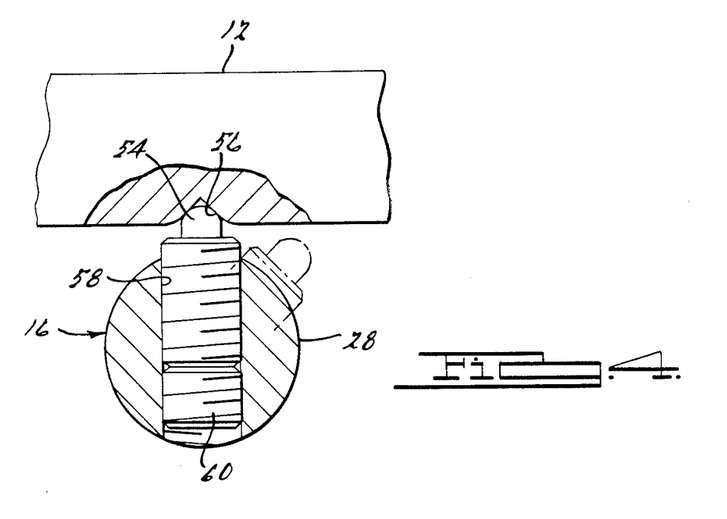
FIG. 4 is a cross-sectional view taken along line 4—4 of FIG. 3 showing the transfer bar detent according to a first embodiment of this invention.

Since it is necessary to ensure that the transfer bar segment 28 is maintained in a particular longitudinal and rotated position so that it will properly engage the intermediate transfer bar segment 39 when it is returned to its original position, a locating means is necessary. In accordance with a first embodiment of this invention, such means comprises a spring loaded plunger or detent 54, as shown in FIG. 4. The plunger 54 engages a socket 56 formed on the bottom surface of the pallet 12. The plunger 54 is maintained in position within the bore 58 by a backup screw 60. The bore 58 is positioned with respect to the socket 56 such that the plunger 54 engages the socket when the transfer bar segment 28 is in the position shown in FIG. 2. This position corresponds to the position of the transfer bar segment 28 when the rotary indexing table 24 is rotating the pallet to a desired machining orientation. Accordingly, vibrations or other forces to which the transfer bar segment 28 is subjected in use will not cause it to move from its established orientation which could cause interference and possibly damage to the transfer assembly if the transfer bar segment failed to properly engage the intermediate transfer bar segment 39.

FIG. 7 illustrates a second embodiment of a transfer assembly according to this invention which is generally designated by reference number 70. Most elements of the transfer assembly 70 are identical to those of the transfer assembly 10, and these elements are accordingly designated by like reference numbers. The transfer assembly 70, however, differs from the transfer assembly 10 in the means employed to locate the transfer bar segment 28 during the rotary indexing operation. In accordance with this embodiment, a separate fluid operated cylinder 72 is provided having an actuated plunger 74 that engages a bore 76 in the transfer bar segment 28. Fluid signals are provided to the cylinder 72 to position the bar when it is rotated out of engagement with associated bar sections. FIG. 7 also illustrates the various rotated positions of the transfer dog 36 such that, in one rotated orientation of the transfer bar segment 28, the pallet 12 is engaged, and in other rotated position, it is not engaged by the transfer dogs. In all other respects, the transfer assembly 70 operates in a manner identical to that explained in connection with the transfer assembly 10.

Figure 10:
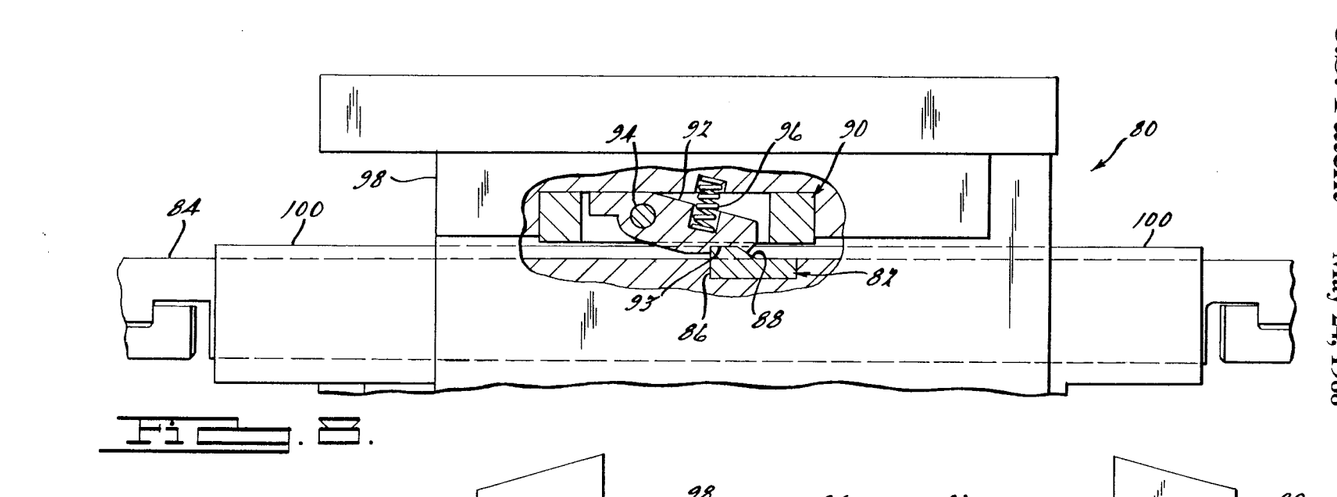
FIG. 10 is a top view of the transfer assembly shown in FIG. 8.
Figure 11:
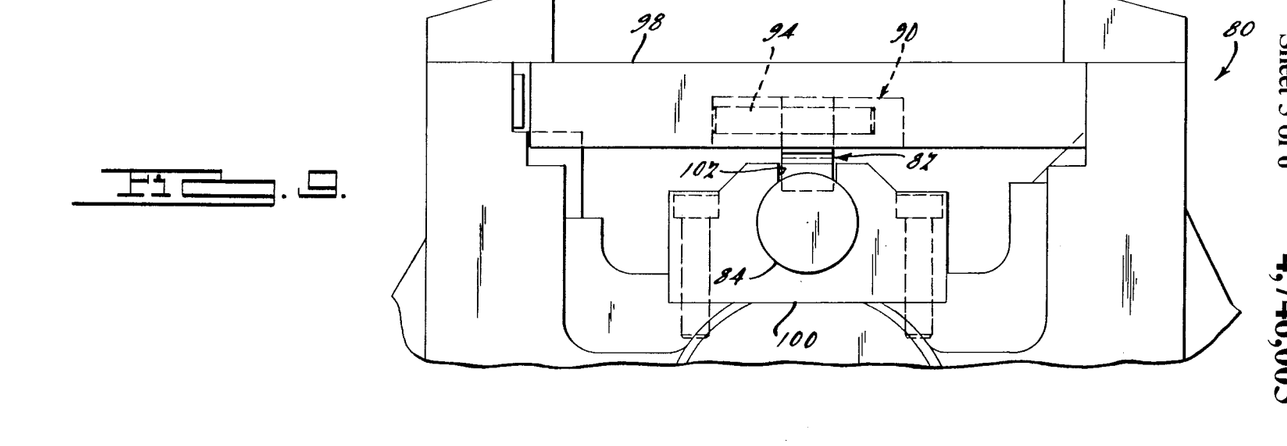

FIGS. 8 through 10 illustrate a transfer assembly 80 in accordance with a third embodiment of this invention. In accordance with this invention, the transfer dog mechanisms of the prior embodiments are replaced with a modified transfer dog 82 affixed to modified transfer bar segment 84. oriented generally perpendicular to the longitudinal axis of the transfer bar segment 84 and also forms a sloping surface 88. The transfer dog latch assembly 90 includes a latch lever 92 which is pivotable about a pin 94 and is biased into engagement with the transfer dog 82 by a spring 96. The latch lever 92 has a pocket 93 having a shape which compliments that of the transfer dog 82. The transfer dog latch assembly 90 is affixed to the pallet 98 in a pocket within the lower surface thereof.

For this embodiment, longitudinal indexing of the pallet 98 is accomplished without requiring the transfer bar segment 84 to rotate about its longitudinal axis. Instead, when the assembly is the configuration shown in FIG. 8, as the transfer bar segment 84 is moved to the left, driving surface 86 engages latch lever 92 such that they are coupled to permit advancement of the pallet 98. Once the pallet reaches its indexed longitudinal position, the transfer bar segment 84 is retracted and the slopped surface 88 causes latch lever 92 to escape driving engagement with the transfer dog 82. The transfer bar segment 84 is then retracted to a position where the transfer dog 82 engages the transfer dog latch assembly 90 of a downstream pallet. This embodiment has the advantage that it does not require rotation of the various transfer bar segments 84 which can be somewhat complicated by the slight amount of lost rotational motion introduced at the interfaces between the transfer bar segments. In addition to providing driving engagement for advancing the pallet 98, the transfer bar latch assembly 90 and the transfer dog 82 further maintain the transfer bar segment 84 in a desired rotation and longitudinal position during rotary indexing, as explained in conjunction with the first embodiments.

FIGS. 9 and 10 further illustrate the use of modified open bearings 100 used in conjunction with the transfer assembly 80. The open bearings 100 have a radial extending slot 102 which provide clearance for passage of the transfer dog 82. The opening bearing 100 further acts as a wiper to remove excess residue from the transfer bar segment 84 as it enters the bearings 100.

While the above description constitutes the preferred embodiments of the present invention, it will be appreciated that the invention is susceptible to modification, variation and change without departing from the proper scope and fair meaning of the accompanying claims.

What is claimed is:

1. A workpiece transfer assembly enabling a workpiece affixed to a pallet to be rotated comprising:
a pallet supporting means,
a first transfer bar segment,
bearing means carried by said pallet supporting means for supporting said first transfer bar segment for longitudinal movement about its longitudinal axis,
a rotary indexing table for rotating said pallet supporting means,
an intermediate transfer section for transporting said pallet to or from said pallet supporting means,
a second transfer bar segment carried by said intermediate transfer section,
transfer bar actuation means for longitudinally moving said transfer bar segments along said longitudinal axis, and
interlocking means on at least one of the ends of said first transfer bar segment and on at least one end of said second transfer bar segment for enabling said longitudinal movement along said longitudinal axis to be transmitted between said transfer bar segments when they are longitudinally aligned, but permitting said first transfer bar segment to rotate out of engagement with said second transfer bar segment when said rotary indexing table is rotated, whereby a workpiece supported by said pallet may be rotated to a desired rotated position at a work station and thereafter returned to a position of longitudinal alignment between said transfer bar segments for indexing along said transfer line.

2. The workpiece transfer assembly according to claim 1, further comprising means for positioning said first transfer bar segment with respect to said pallet when said pallet is rotated such that said transfer bar segments are out of longitudinal alignment.

3. The workpiece transfer assembly according to claim 2, wherein said means comprises a spring loaded plunger carried by said first transfer bar segment which engages a cavity formed by said pallet.

4. The workpiece transfer assembly according to claim 2, wherein said means for positioning a fluid actuated cylinder which acts upon a plunger, and a cavity formed in said first transfer bar segment which receives said plunger in a desired orientation of said first transfer bar segment.

5. The workpiece transfer assembly according to claim 1, wherein said interlocking means comprises male and female key slot features formed by said first and second transfer bar segments.

6. The workpiece transfer assembly according to claim 1, wherein said bearing means include a pair of separated bearings each having radially open sections.

7. The workpiece transfer assembly according to claim 1 wherein said transfer bar actuation means further rotates said transfer bar segments about said longitudinal axis and said first transfer bar segment includes at least one transfer dog which engages said pallet when said first transfer bar segment is in a first rotated position and disengages said pallet when said first transfer bar segment is in a second rotated position.

8. The workpiece transfer assembly according to claim 7 wherein a pair of said transfer dogs are provided which engage opposite edge surfaces of said pallet.

9. The workpiece transfer assembly according to claim 1 further comprising a transfer dog affixed to said first transfer bar segment, said transfer dog having a driving surface; and a transfer dog latch assembly coupled to said pallet, said latch assembly engaging said transfer dog driving surface when said first transfer bar segment is longitudinally indexed in a first direction and disengaging said transfer dog when said first transfer bar segment is longitudinally indexed in a second direction opposite said first position whereby said pallet is intermittently indexed in response to longitudinal reciprocation of said transfer bar segments.

10. The workpiece transfer assembly according to claim 9 wherein said transfer dog latch assembly includes a lever pivotable about a pin and spring means for biasing said lever, said transfer dog further defining a sloping surface whereby said sloping surface allows said lever to disengage said transfer dog when said first transfer bar segment is moved in said second direction.

11. In a transfer machine of the type having a plurality of in-line work stations having tool means operative to act on work in said stations, transfer means for indexing work—carrying pallets progressively from station to station in the machine, and a turning device in at least one of said stations for turning a pallet in said station rotatively about an axis different than the direction of pallet movement by said transfer means, said turning device including a rotatably driven part for supporting a pallet in said station, and said rotatably driven part being provided with means for locating said pallet precisely with respect to said tool means in said station and for holding the same securely in the located position, the improvement wherein said transfer means includes a transfer bar formed in separate coactive discrete sections, one of said sections being carried by and axially slideable relative to and rotatable with the rotatably driven part of the turning device in said one station; and wherein said transfer means further includes interlocking means for holding said one section of said transfer bar normally detachably interconnected with adjacent sections of said transfer bar for mutual axial sliding movement but permits disengagement of said one section from said adjacent sections when rotated relative thereto by the rotatably driven part of said turning device.

12. The combination defined by claim 7 further including means for holding said one section of said transfer bar normally in predetermined longitudinal and rotative positions relative to the rotatably driven part of said turning device when said one section is disengaged from the adjacent sections of said transfer bar.

* * * * *

UNITED STATES PATENT AND TRADEMARK OFFICE
CERTIFICATE OF CORRECTION

PATENT NO. : 4,746,005

DATED : May 24, 1988

INVENTOR(S) : Frank Bihary et al

It is certified that error appears in the above-identified patent and that said Letters Patent is hereby corrected as shown below:

Column 1, line 38, "statisfactorily" should be --satisfactorily--.

Column 1, line 59, "stations" should be --station--.

Column 4, line 43, "are" should be --is--.

Column 5, line 37, before "oriented" insert --The transfer dog 82 has a side driving surface 86 which is--.

Signed and Sealed this

Thirteenth Day of December, 1988

Attest:

DONALD J. QUIGG

*Attesting Officer*   *Commissioner of Patents and Trademarks*